United States Patent [19]
Havera

[11] 3,906,100

[45] Sept. 16, 1975

[54] N-BENZYL-N-[2-PHENYL-2-(4-PHENYL-1-PIPERIDYL)-ETHYL]-PROPIONAMIDE PARA-CHLOROBENZENE SULFONATE

[75] Inventor: Herbert John Havera, Edwardsburg, Mich.

[73] Assignee: Miles Laboratories, Inc., Elkhart, Ind.

[22] Filed: Apr. 3, 1974

[21] Appl. No.: 457,456

Related U.S. Application Data

[62] Division of Ser. No. 363,425, May 24, 1973.

[52] U.S. Cl. .................................................. 424/267
[51] Int. Cl.² ...................................... A61K 31/445
[58] Field of Search .................................... 424/267

[56] References Cited

UNITED STATES PATENTS

| | | | |
|---|---|---|---|
| 3,518,274 | 6/1970 | Strycker | 424/267 |
| 3,773,955 | 11/1973 | Pacter et al. | 424/260 |

*Primary Examiner*—Albert T. Meyers
*Assistant Examiner*—Norman A. Drezin
*Attorney, Agent, or Firm*—Myron B. Sokolowski

[57] ABSTRACT

N-benzyl-N-[2-phenyl-2-(4-phenyl-1-piperidyl)ethyl]propionamide p-chlorobenzenesulfonate has effectiveness comparable to methadone in suppressing narcotic withdrawal symptoms and in maintenance therapy of narcotic addicted laboratory mammals.

1 Claim, No Drawings

N-BENZYL-N-[2-PHENYL-2-(4-PHENYL-1-PIPERIDYL)-ETHYL]-PROPIONAMIDE PARA-CHLOROBENZENE SULFONATE

This is a division of application Ser. No. 363,425, filed May 24, 1973.

BACKGROUND OF THE INVENTION

1. Field of the Invention

Treatment of narcotic addiction currently involves two overlapping aspects and objectives: withdrawal of the narcotic and rehabilitation of the addict. In the case of opioid dependence, specifically heroin or morphine addiction, the treatment of withdrawal symptoms and rehabilitation merge in the concept of maintenance therapy.

Maintenance therapy is a relatively new approach to narcotic addiction pioneered predominantly by Dole and co-workers (Arch. Int. Med., 118: 304 [1966]; J. Am. Med. Ass'n., 206: 2708 [1968]; and New Engl. J. Med., 280: 1372 [1969]). The therapeutic regimen devised by Dole et al. involves stabilization of narcotic addicts by the oral administration of a narcotic substitute so that the euphoric effects of even high doses of intravenously administered narcotics are obviated. Oral administration of the narcotic substitute is of central importance to maintenance therapy because the psychological extremes which characterize effects of repeated intravenously administered narcotics are eliminated. Oral ingestion of the narcotic substitute also facilitates supervision of administration, thus minimizing the possibility of illicit redistribution of the substitute.

The narcotic substitute most frequently utilized in maintenance therapy is methadone hydrochloride (hereinafter referred to as "methadone"). Although the use of methadone as a narcotic substitute in maintenance therapy has been relatively successful, it is potentially subject to abuse if administered intravenously to obtain potentiated narcotic effects.

This invention provides a possible candidate for the suppression of withdrawal effects of narcotics and for the maintenance therapy of addiction which is effective only upon oral administration.

2. Description of the Prior Art

Bochmuhl et al. reported the synthesis and structure of methadone, 6-dimethylamino-4,4-diphenyl-3-heptanone (Ann., 561: 52 [1948]). As is evident from its structure,

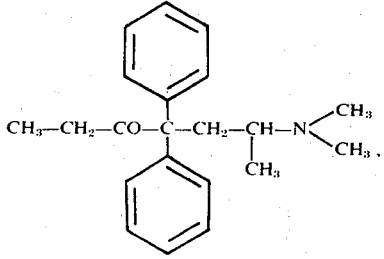

methadone is chemically unrelated to N-benzyl-N-[2-phenyl-2-(4-phenyl-1-piperidyl)-ethyl]propionamide p-chloro-benzenesulfonate (hereinafter designated as TR 2923).

Strycker (U.S. Pat. No. 3,518,274 [1970]) disclosed certain congeners of TR 2923 which are reported as analgetics. Although these congeners are chemically similar to TR 2923, they do not exhibit the unexpected properties of TR 2923 in suppressing narcotic withdrawal symptoms or utility in maintenance treatment of narcotic addiction.

SUMMARY OF THE INVENTION

This invention comprises: (1) the compound N-benzyl -N-[2-phenyl-2-(4-phenyl-1-piperidyl)ethyl]-propionamide p-chlorobenzenesulfonate; (2) its total synthesis; and (3) its utility in the treatment of narcotic abstinence symptoms or in the maintenance treatment of narcotic addicted experimental animals.

N-benzyl-N-[2-phenyl-2-(4-phenyl-1-piperidyl)ethyl]propionamide p-chlorobenzenesulfonate (hereinafter referred to as TR 2923) has the following structural formula:

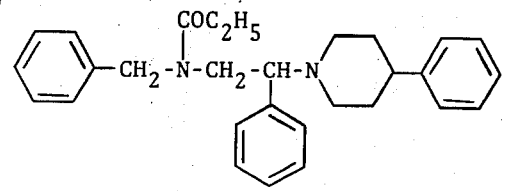

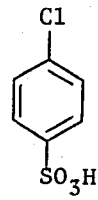

One of the physical chemical properties of TR 2923 which is germane to its utility is its virtual insolubility in water (less than 0.05%).

Example 1 of the "Description of Preferred Embodiments" section of this specification delineates the total synthesis of TR 2923, which is a modification of the method disclosed by W.G. Strycker in U.S. Pat. No. 3,518,274 (issued June 30, 1970). For purposes of this section, the following sequence of reactions represents a compendium of this synthesis:

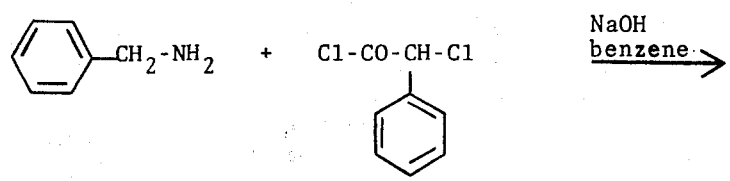

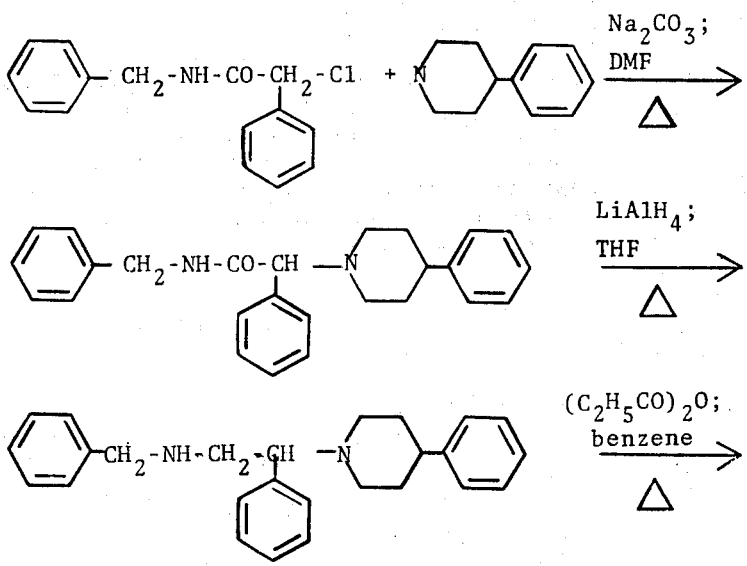

In contrast to its congeners, TR 2923, when administered orally, exhibits unexpected utility in suppression of narcotic withdrawal (or abstinence) symptoms and in model maintenance therapy of narcotic addicted experimental animals. Example 2 of the Description of Preferred Embodiments section of this specification outlines detailed results of the comparable effectiveness of TR 2923 to the reference drug methadone in suppressing naloxone-precipitated abstinence symptoms in narcotic addicted rats. Example 2 also demonstrates the utility of TR 2923 as a possible alternate to methadone in the maintenance therapy of narcotic addiction. For purposes of definition, the term "maintenance therapy" refers to the therapeutic concept and regimen developed by Dole and co-workers (see references cited in "Field of the Invention", supra).

Like methadone, TR 2923 is effective when orally administered; unlike methadone, however, TR 2923 cannot be administered intravenously because of its insoluble character. As a potential alternate to methadone in maintenance treatment of narcotic addicts, TR 2923 possesses the additional advantage that it cannot be abused by intravenous self-administration to obtain potentiated effects. In Example 2, TR 2923 was suspended in 20% (W/V) mucilage of acacia. Alternately it can be mixed with a chocolate paste, or with other preparations for oral ingestion.

This invention, accordingly, has the following objects:

1. to provide a compound which suppresses narcotic withdrawal symptoms in narcotic addiction;
2. to prepare a compound which is a potential alternate to methadone in maintenance therapy of narcotic addiction; and
3. to furnish a compound which has the above objects and which additionally can be administered only orally.

DESCRIPTION OF THE PREFERRED EMBODIMENTS

EXAMPLE 1

Synthesis of N-Benzyl-N-[2-Phenyl-2-(4-Phenyl-1-Piperidyl)Ethyl]Propionamide Para-Chlorobenzenesulfonate.

A. N-Benzyl-$\alpha$-Chlorophenylacetamide

A benzene solution of $\alpha$-chlorophenylacetyl chloride (113.5 g, 0.6 mole) was slowly added to an ice-cold, stirred solution of benzylamine (64.4 g, 0.6 mole) in 650 ml of benzene and 200 ml of 20% NaOH. This mixture was stirred in the cold for an additional hour and subsequently filtered. The solid obtained from the concentration of the filtrate was recrystallized from an aqueous methyl alcohol: yield, 145 g; m.p. 96.5°–97.0°.

Analysis:
Calculated: $C_{15}H_{14}ClNO$: N, 5.39.
Found: N, 5.28.

B. N-Benzyl-2-Phenyl-2-(4-Phenyl-1-Piperidyl) Acetamide

A mixture of N-benzyl-$\alpha$-chlorophenylacetamide (62 g, 0.239 mole), 4-phenylpiperidine (38.5 g, 0.239 mole), sodium carbonate (28.6 g, 0.27 mole) and 350 ml of dimethylformamide was heated under reflux with stirring for 20 hours. The mixture was filtered. The filtrate was diluted with methyl alcohol and water, then cooled. The solid that formed was collected and dried: yield, 73.2 g; m.p. 133°–134°.

Analysis:
Calcuated: $C_{26}H_{28}N_2O$: N, 7.29.
Found: N,7.42.

C. N-[2-Phenyl-2-(4-Phenyl-1-Piperidyl)Ethyl]Benzylamine

A tetrahydrofuran (THF) solution of N-benzyl -2-phenyl-2-(4-phenyl-1-piperidyl)acetamide (73 g, 0.19 mole) was slowly added to a stirred suspension of $LiAlH_4$ (11 g, 0.285 mole) in 150 ml of THF and the mixture was heated under reflux for 16 hours. The cooled mixture was reacted with 11 ml of water in 100 ml of THF (dropwise) followed by 11 ml of 20% NaOH, and 33 ml of water. The mixture was filtered and the filtrate was concentrated and distilled: b.p., 210°–218°; yield, 46 g.

Analysis:
Calculated: $C_{26}H_{30}N_2$: N, 7.56.
Found: N, 7.54.

D. N-Benzyl-N-[2-Phenyl-2-(4-Phenyl-1-Piperidyl)Ethyl]Propionamide

To 48 g (0.13 mole) of N-[2-phenyl-2-(4-phenyl-1-piperidyl)ethyl]benzylamine in 150 ml of dry benzene was added 17.0 g (0.13 mole) of propionic anhydride. The reaction mixture was heated at reflux for 2 hours. The solution was treated with 200 ml of 10% NaOH and then washed with water. The organic layer was dried over $MgSO_4$ and concentrated in vacuo giving an oil which was used without an further purification in the preparation of the p-chlorobenzenesulfonate.

E. N-Benzyl-N-[2-Phenyl-2-(4-Phenyl-1-Piperidyl Ethyl]Propionamide p-Chlorobenzenesulfonate.

To 1.5 g (0.0035 mole) of N-benzyl-N-[2-phenyl-2-(4-phenyl-1-piperidyl)ethyl]propionamide was added 0.7 g (0.0035 mole) of p-chlorobenzenesulfonic acid in 10 ml of $CH_3OH$. Upon addition of ether a solid formed. The solid was recrystallized from methyl alcohol and ether: yield, 1.2 g, m.p. 155-157°, solubility < 5.2 × $10^{-2}$% in water.

Analysis:

Calculated: $C_{35}H_{39}ClN_2O_4S$: C, 67.89; H, 6.35; N, 4.52.

Found: C, 68.39; H, 6.47; N, 4.28.

EXAMPLE 2

Comparative Effectiveness of Orally Administered Doses of
N-Benzyl-N-[2-Phenyl-2-(4-Phenyl-1-Piperidyl)-Ethyl]Propionamide Para-Chlorobenzenesulfonate (TR 2923) and Methadone in Suppressing Narcotic Withdrawal Effects and in Maintenance Therapy of Morphine Addicted Rats It has been demonstrated that narcotic addiction quickly can be induced in the rat by continuous exposure to morphine (Greenbach, Fed. Proc., 28: 262 [1969]), and that the degree of this addiction can be assessed by the intensity of abstinence symptoms or by the dose of naloxone required to precipitate such symptoms (Way et al., Science, 162: 1290 [1968]). Abstinence effects or withdrawal symptoms in morphine addicted rats include diarrhea, irritability to handling, chewing, withdrawal jumping, and teeth chattering. A rapid test for the action of drugs on addiction in the rat, utilized in this Example, involves induction of addiction with a single subcutaneous dose of 150 mg/kg of morphine in a sustained release suspension and, 24 hours later, precipitation of withdrawal effects by administration of a subcutaneous dose of naloxone of 1.0 mg/kg (H.O.J. Collier, et al., Nature: 237,220 [1972]). To compare the effects of TR 2923 and methadone in naloxone precipitated withdrawal symptoms, varying doses of either drug were orally administered to the rats.

Methadone HCl or TR 2923 was administered orally in distilled water or a suspension of 20% W/v mucilage of acacia, respectively.

Tables I and II summarize the results of suppression by oral methadone HCl or TR 2923 of naloxone-precipitated morphine withdrawal symptoms in the morphine addicted rat. The numerator represents the number of rats in which a given symptom was observed while the denominator denotes the population of rats involved.

TABLE I

| Drug Treatment 1 h Prior to Naloxone | Dose in mg Base/kg P.O. | No. of Deaths Prior to Naloxone | Incidence of Withdrawal Effect in Morphine-Dependent Rats | | |
|---|---|---|---|---|---|
| | | | Diarrhea by 30 Min. | Irritability to Handling | Chewing |
| Distilled water | — | 0/6 | 6/6 | 4/6 | 6/6 |
| Methadone HCl | 40 | 1/5 | 3/4 | 2/4 | 1/4* |
| | 80 | 1/6 | 0/5* | 0/5* | 1/5* |
| | 160 | 4/5 | 0/1 | 0/1 | 0/1 |
| Acacia | — | 0/8 | 7/8 | 7/8 | 4/8 |
| TR 2923 | 40 | 0/8 | 7/8 | 7/8 | 3/8 |
| | 80 | 1/6 | 5/5 | 3/5 | 2/5 |
| | 160 | 1/8 | 5/7 | 1/7* | 2/7 |

Naloxone was given at 1 mg base/kg S.C.
*Indicates significant (P <0.05) suppression of withdrawal effect compared to controls.

TABLE II

| Drug Treatment 1 h Prior to Naloxone | Dose in mg base/kg P.O. | No. of Deaths Prior to Naloxone | Percentage Incidence of Withdrawal Effect in Morphine-Dependent Rats | | | | |
|---|---|---|---|---|---|---|---|
| | | | Jumping | Diarrhea by 15 Min. | to touch | Irritability to handling | Chewing | Teeth Chattering |
| Distilled water | — | 0/9 | 78 | 78 | 44 | 100 | 100 | 100 |
| Methadone HCl | 40 | 0/10 | 30 | 0* | 0* | 40* | 50 | 40* |
| | 80 | 3/10 | 0* | 0* | 0* | 14* | 14* | 0* |
| | 160 | 5/10 | 0* | 0* | 0 | 20* | 40* | 0* |
| Acacia | — | 0/12 | 83 | 100 | 8 | 75 | 100 | 100 |
| TR 2923 | 40 | 2/9 | 78 | 78 | 11 | 78 | 100 | 100 |
| | 80 | 3/12 | 56 | 67 | 11 | 67 | 100 | 100 |
| | 160 | 2/12 | 40* | 40* | 0 | 20* | 90 | 90 |

*Indicates significant (P <0.05) suppression of withdrawal effect compared to controls.
Naloxone was given at 1 mg base/kg S.C.

EXAMPLE 3

Suppression of Heroin-Seeking Behavior by TR 2923 in Heroin-Addicted Rats

Heroin dependence was induced in two female Wistar rats by the method described by Collier (Endeavor, 31: 123 [1972]). In the latter procedure the rats were prepared with an indwelling intravenous cannula connected to an infusion pump which was activated by a lever in the wall of a cage containing the rats. By pressing the lever, the rats self-injected the heroin.

The rats had reached a stable level of self-administration of heroin over a 2 week period (0.25 mg/kg infusion of heroin at a rate of 0.1 ml/10 sec). During this period the rats were fed chocolate paste (3 g/rat) daily at noon. Food pellets were also available ad lib.

Once the rats became dependent on heroin, they were offered TR 2923 in chocolate paste in three dose levels: 10, 40 and 80 mg/kg, and each treatment day was separated by two days during which chocolate paste alone was available. Over the 24 hour period following administration of TR 2923 orally, self-administration of heroin was reduced. A dose of 10 mg/kg of TR 2923 reduced self-administration of heroin by 37.5%; doses of 40 mg/kg and 80 mg/kg reduced self-administration of heroin by 64.3% and 81.1%, respectively. During the period 20–24 hours after oral administration of 80 mg/kg of TR 2923, one animal began self-administration of heroin at a rate equivalent to that prior to oral treatment. This relapse did not occur until the 28–30 hour period in the other animal. Behavioral effects after administration of TR 2923 in both rats were similar to those seen after heroin.

What is claimed is:

1. A method of suppressing narcotic abstinence symptoms in maintenance therapy of a narcotic addicted mammal comprising:
orally administering to said mammal an effective amount of N-benzyl-N-[2-phenyl-2-(4-phenyl-1-piperidyl)ethyl]propionamide p-chlorobenzenesulfonate.

* * * * *

UNITED STATES PATENT OFFICE
CERTIFICATE OF CORRECTION

PATENT NO. : 3,906,100
DATED : September 16, 1975
INVENTOR(S) : Herbert John Havera It is certified that error appears in the above-identified patent and that said Letters Patent are hereby corrected as shown below:

Columns 3 & 4, before line 23, insert the following 2 lines of drawings:

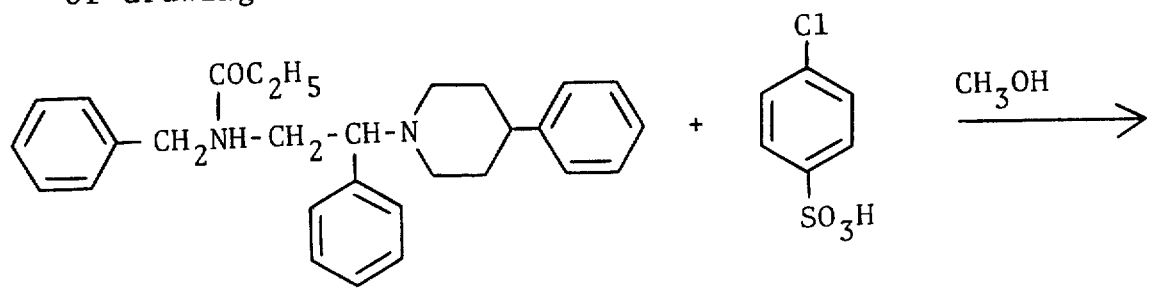

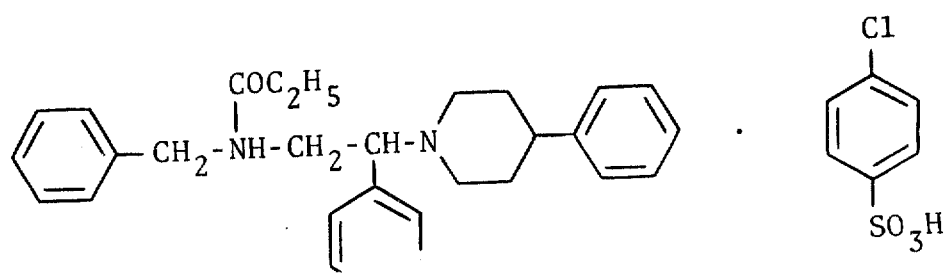

Signed and Sealed this

Eighth Day of March 1977

[SEAL]

Attest:

RUTH C. MASON
Attesting Officer

C. MARSHALL DANN
Commissioner of Patents and Trademarks